United States Patent [19]
Corbalis et al.

[11] Patent Number: 5,224,099
[45] Date of Patent: Jun. 29, 1993

[54] CIRCUITRY AND METHOD FOR FAIR QUEUING AND SERVICING CELL TRAFFIC USING HOPCOUNTS AND TRAFFIC CLASSES

[75] Inventors: Charles M. Corbalis, Milpitas; Lionel A. Bustini, Campbell; Patrick D. Daley, Belmont, all of Calif.

[73] Assignee: Stratacom, Inc., San Jose, Calif.

[21] Appl. No.: 702,635

[22] Filed: May 17, 1991

[51] Int. Cl.⁵ .......................... H04J 3/26; H04L 12/64
[52] U.S. Cl. .................. 370/94.2; 370/94.3; 370/85.7
[58] Field of Search .......... 370/94.2, 94.3, 85.7, 370/95.1, 94.1

[56] References Cited

U.S. PATENT DOCUMENTS

| | | | |
|---|---|---|---|
| 4,491,945 | 11/1985 | Turner | 370/60 |
| 4,494,230 | 1/1985 | Turner | 370/60 |
| 4,506,358 | 3/1985 | Montgomery | 370/60 |
| 4,644,533 | 2/1987 | Braff et al. | 370/60 |
| 4,757,529 | 7/1988 | Glapa et al. | 370/60 |
| 4,771,425 | 9/1988 | Baran et al. | 370/94.1 |
| 4,819,228 | 4/1989 | Baran et al. | 370/94.1 |
| 4,819,230 | 4/1989 | Calvignac et al. | 370/94.1 |
| 4,903,261 | 2/1990 | Baran et al. | 370/94.2 |
| 4,939,718 | 7/1990 | Servel et al. | 370/94.2 |

OTHER PUBLICATIONS

PCT International Search Report Dated Sep. 16, 1992.
IPX System Operation Guide by Stratacom (1988) pp. 1-1-1-2, 2-5-2-8, and 2-13-2-16.

Primary Examiner—Douglas W. Olms
Assistant Examiner—Min Jung
Attorney, Agent, or Firm—Blakely, Sokoloff, Taylor & Zafman

[57] ABSTRACT

A method of fair queuing and servicing cell traffic in a telecommunication node which interfaces with a telecommunication system including a multiplicity of nodes is described. The steps include placing cells of traffic are placed in a queue according to a hopcount associated with each cell of bursty traffic, the hopcount being representative of the number of nodes traversed by the associated cell. Cells of traffic within the queue are serviced according to their associated hopcount. The hopcount associated with each cell of traffic is incremented as each cell of traffic is serviced. Circuitry providing fair queuing and servicing of cell traffic in a telecommunication node which interfaces with a telecommunication system including a multiplicity of nodes is also described.

16 Claims, 11 Drawing Sheets

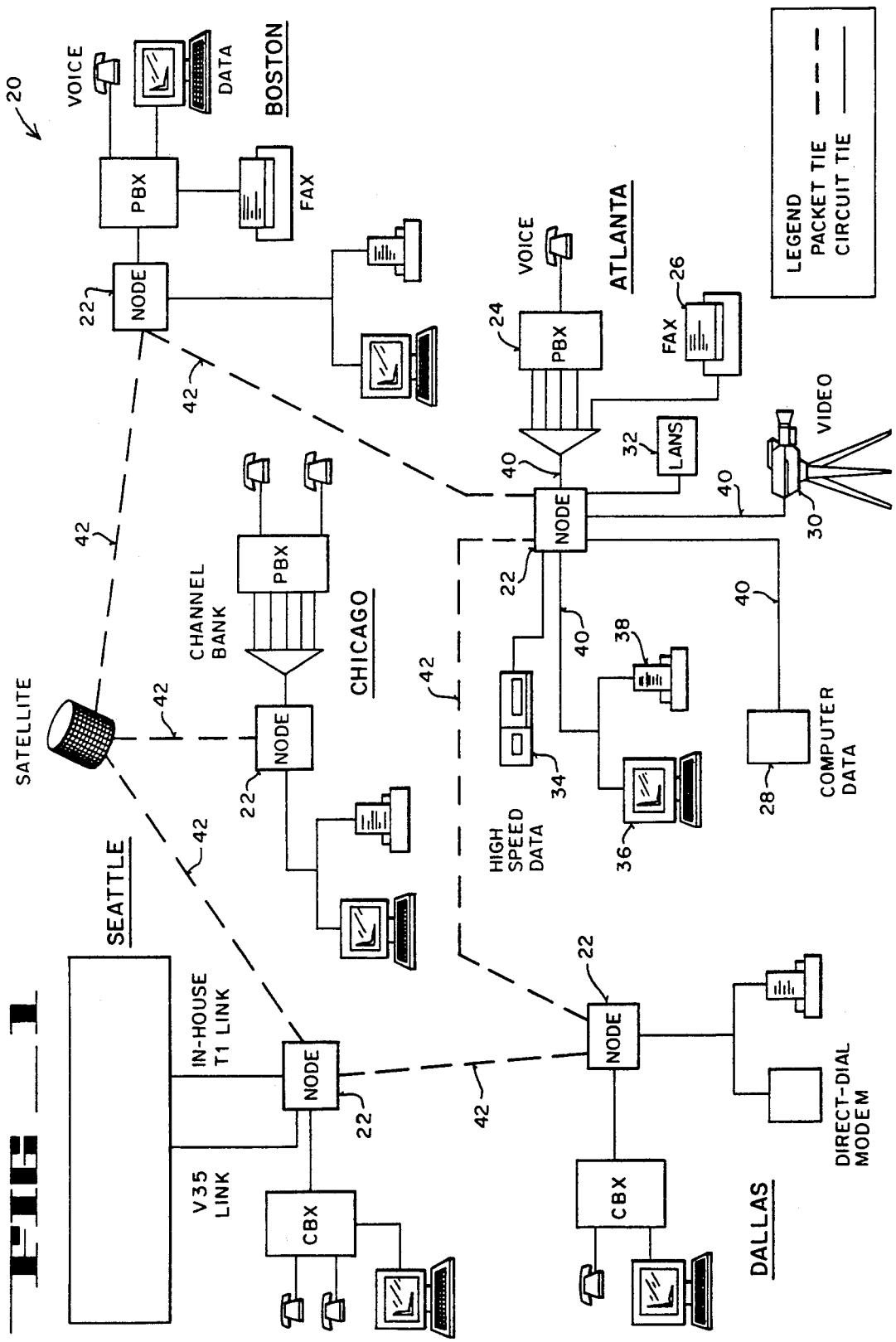
FIG_1

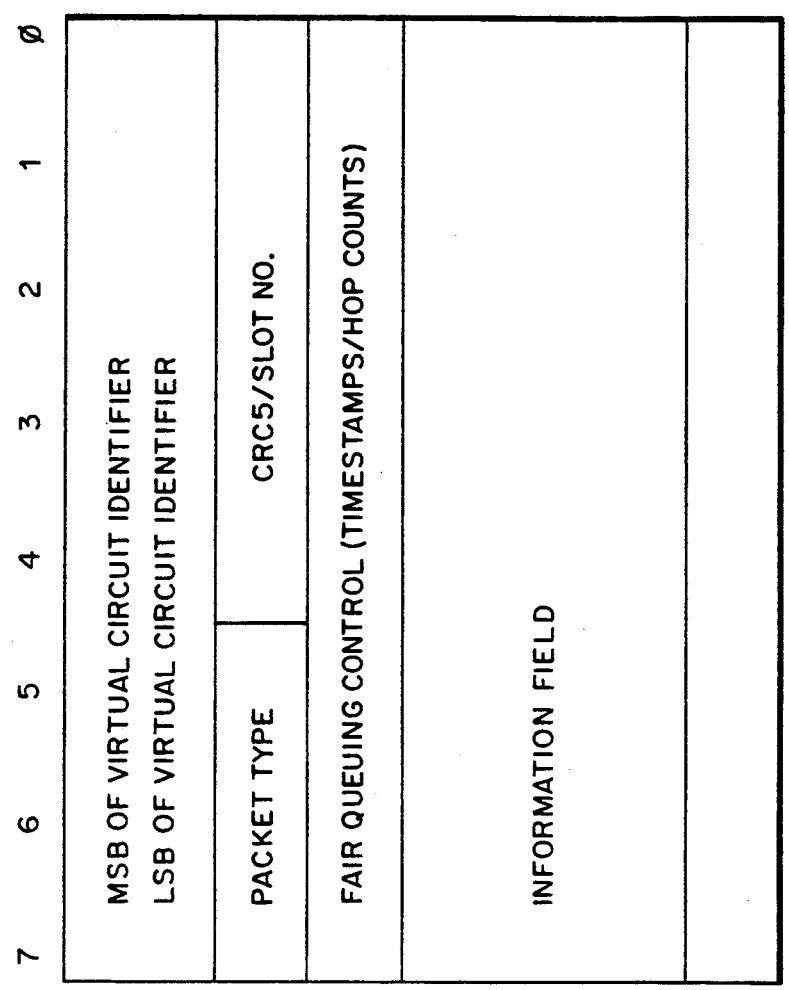
FIG_2

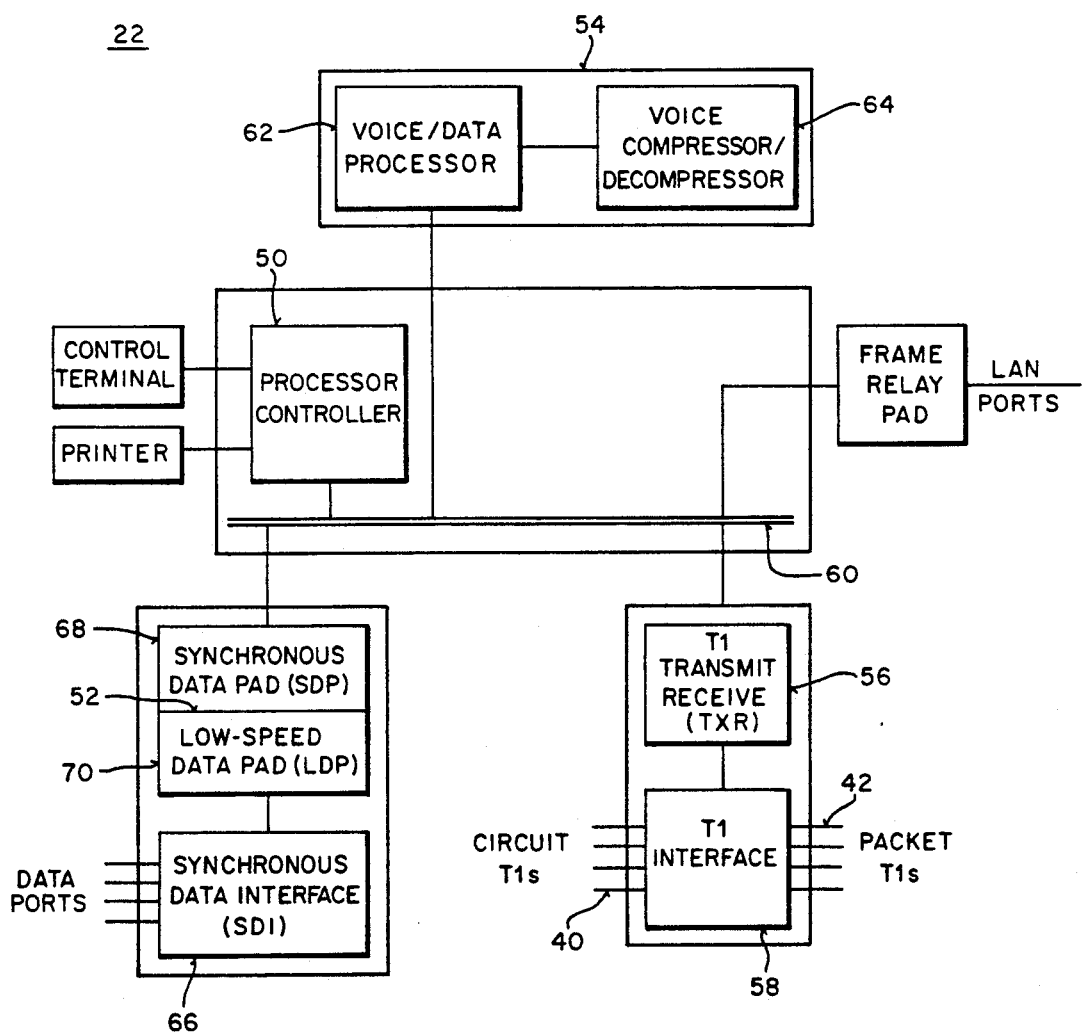

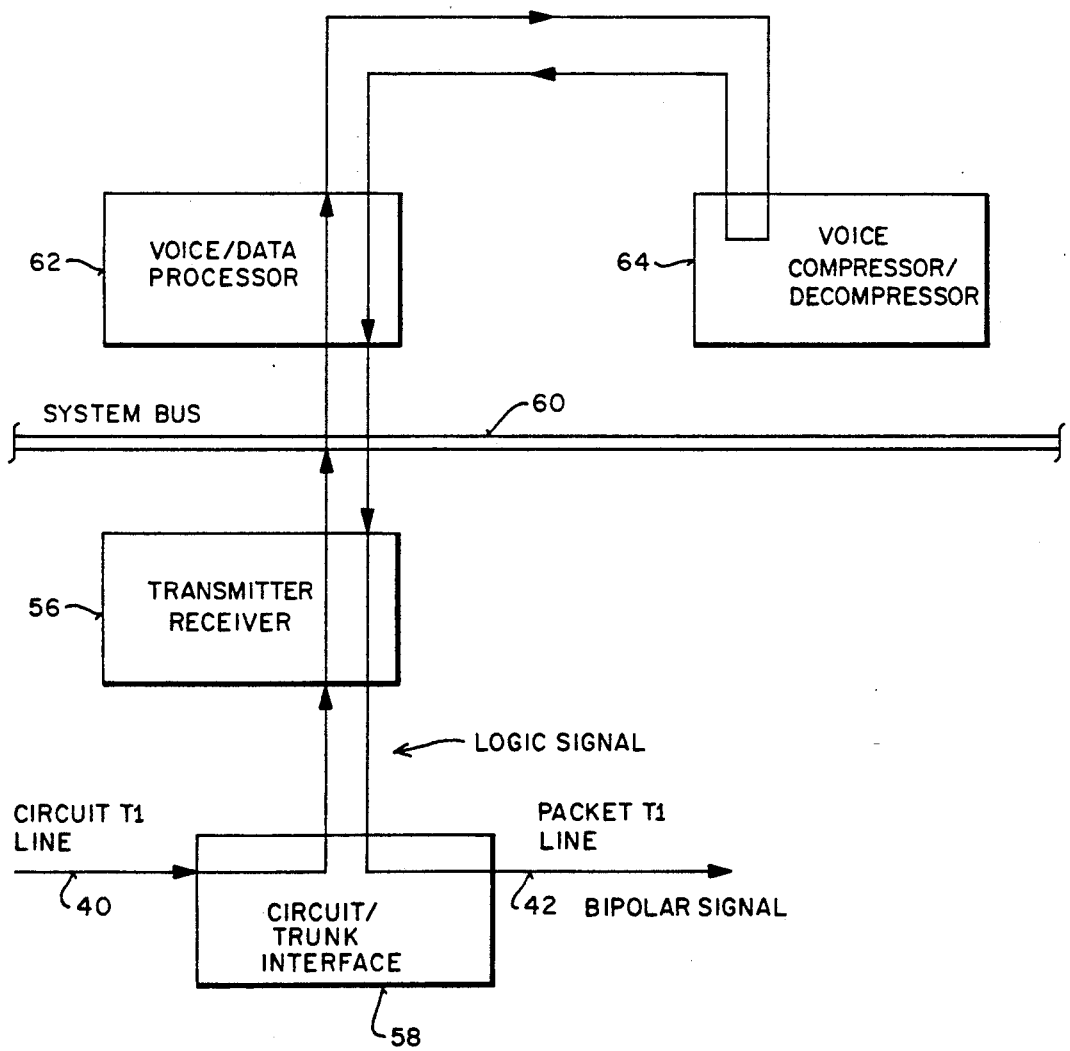

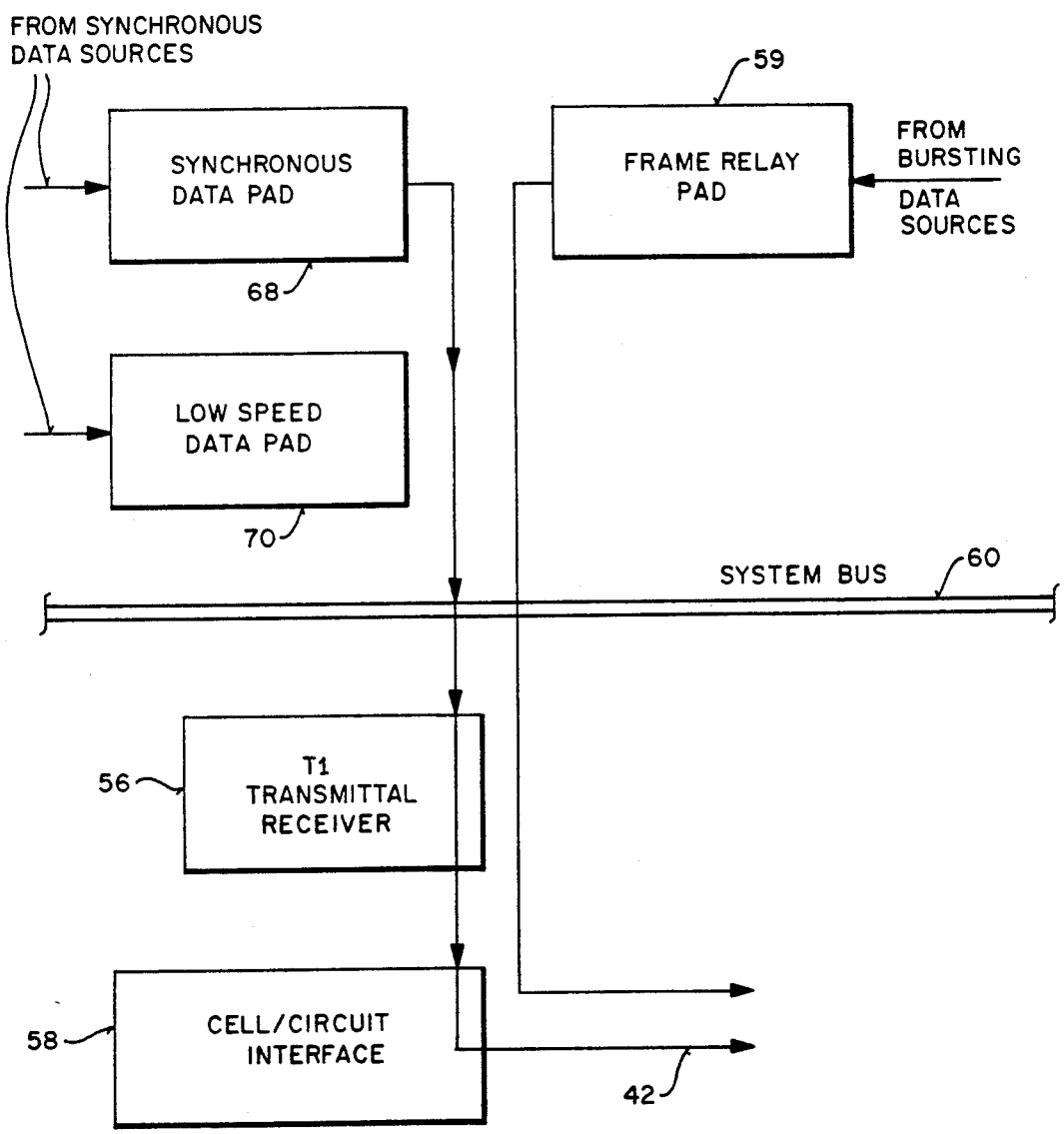

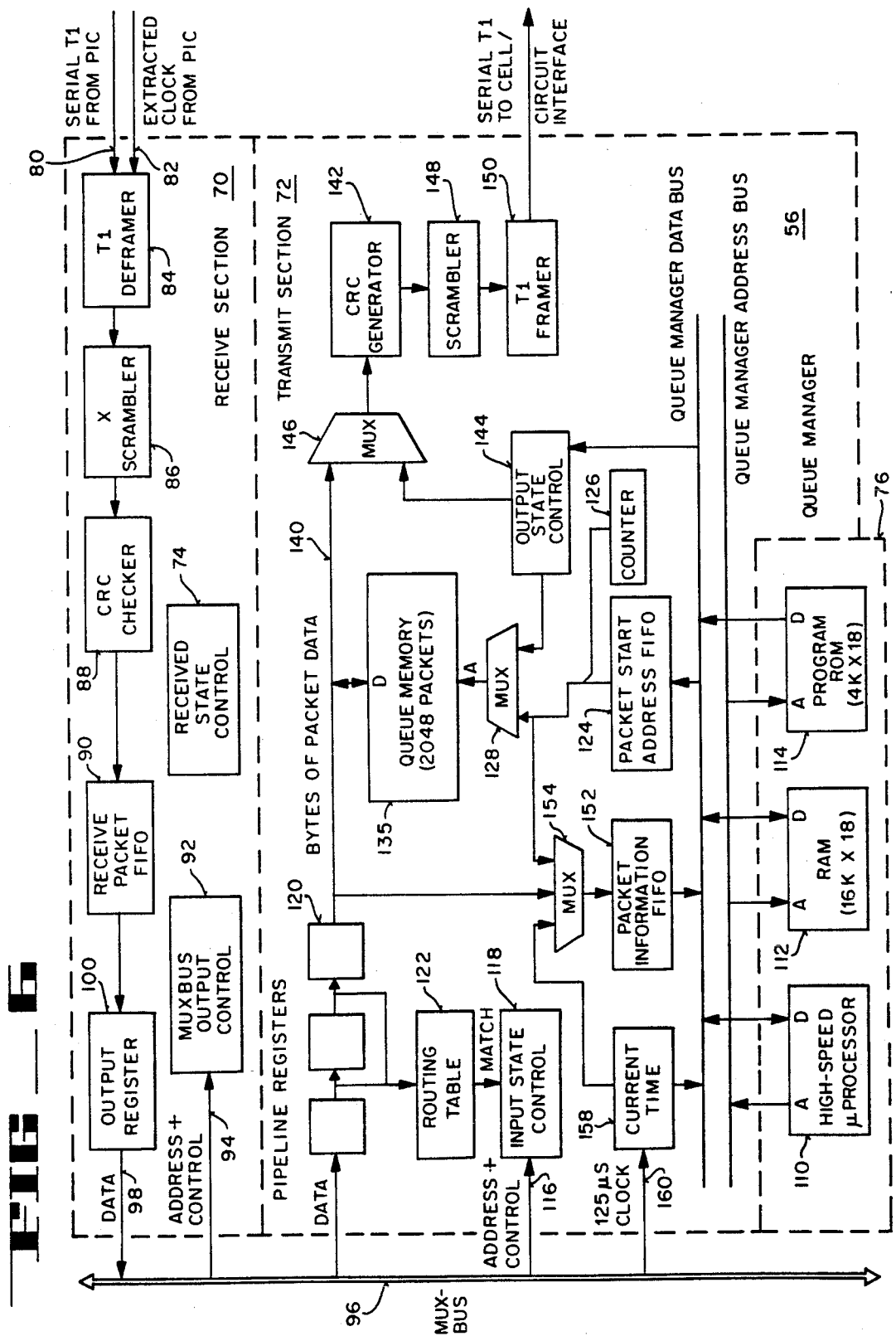

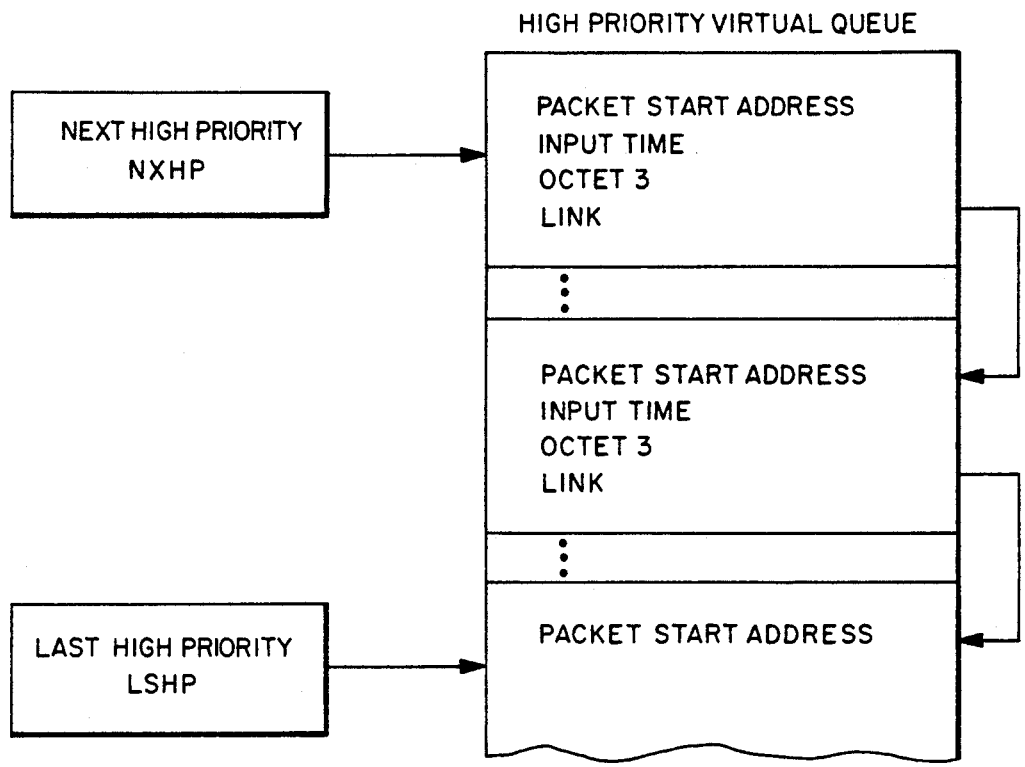
FIG_7A
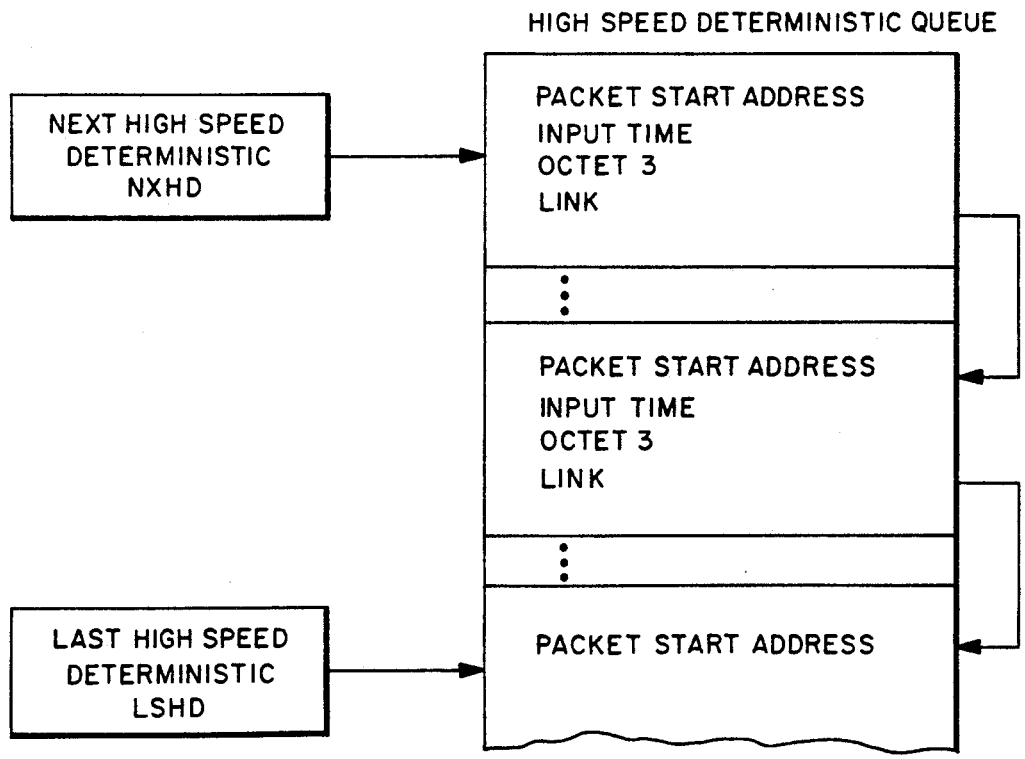
FIG_7B

FIG_8A
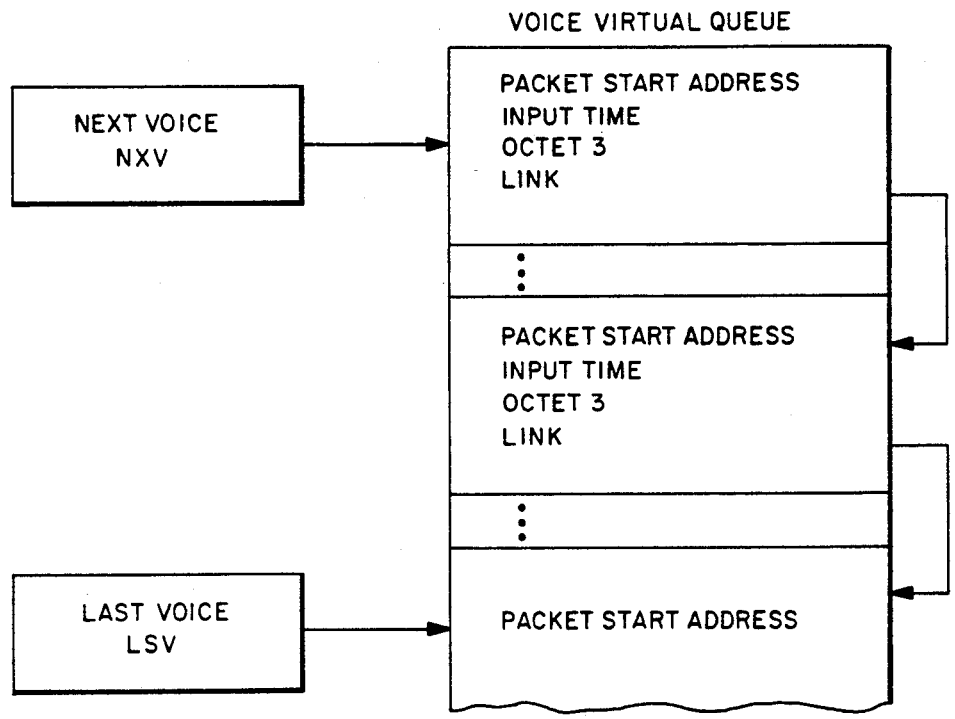
FIG_8B
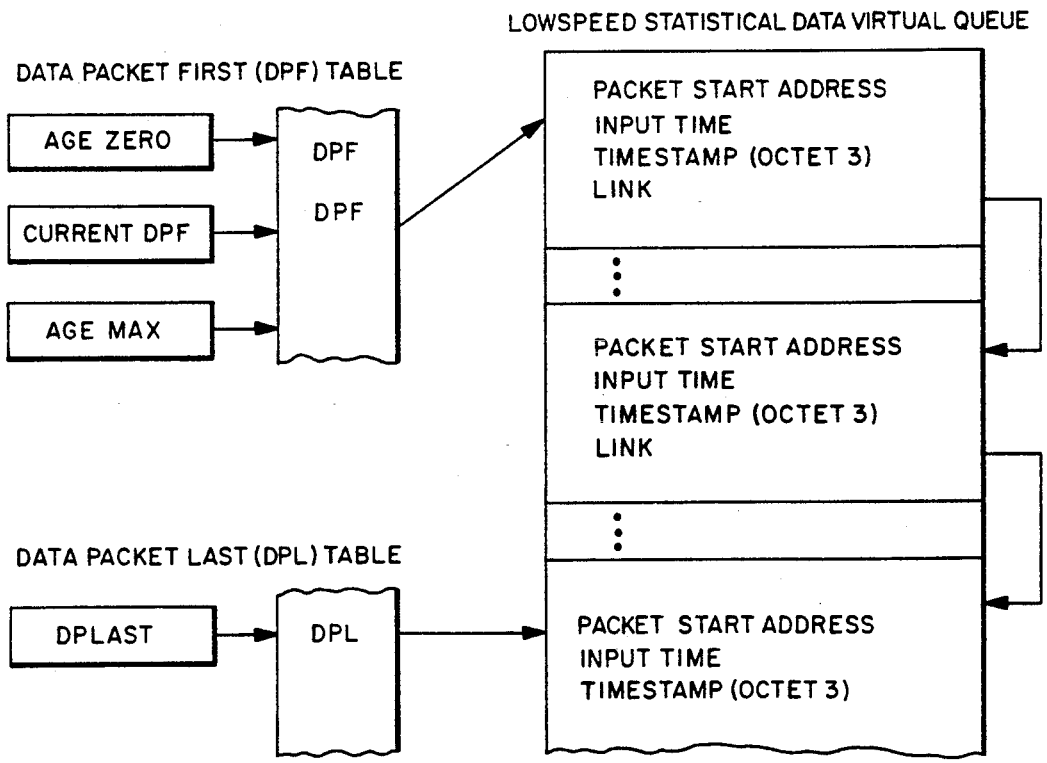

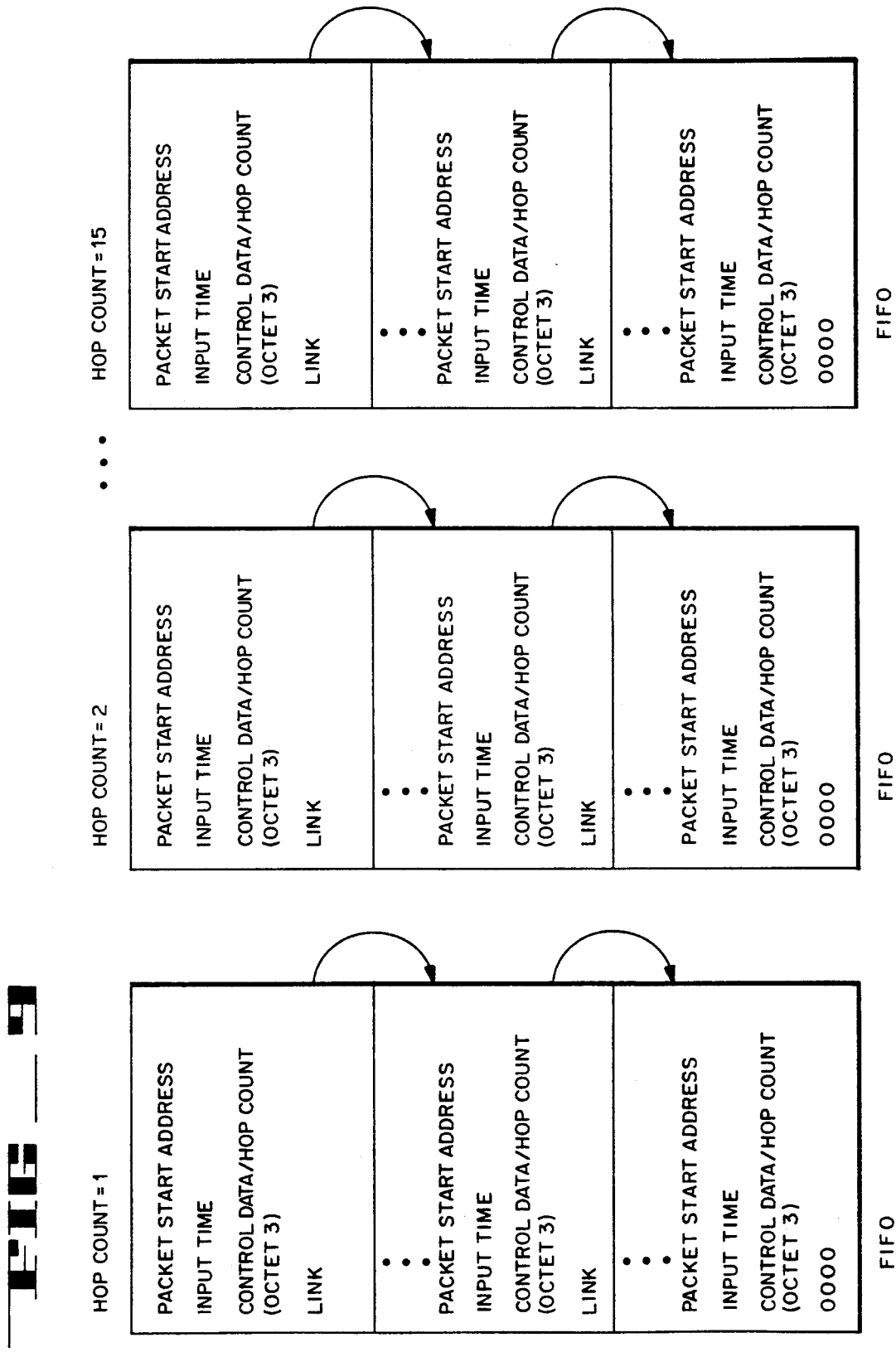

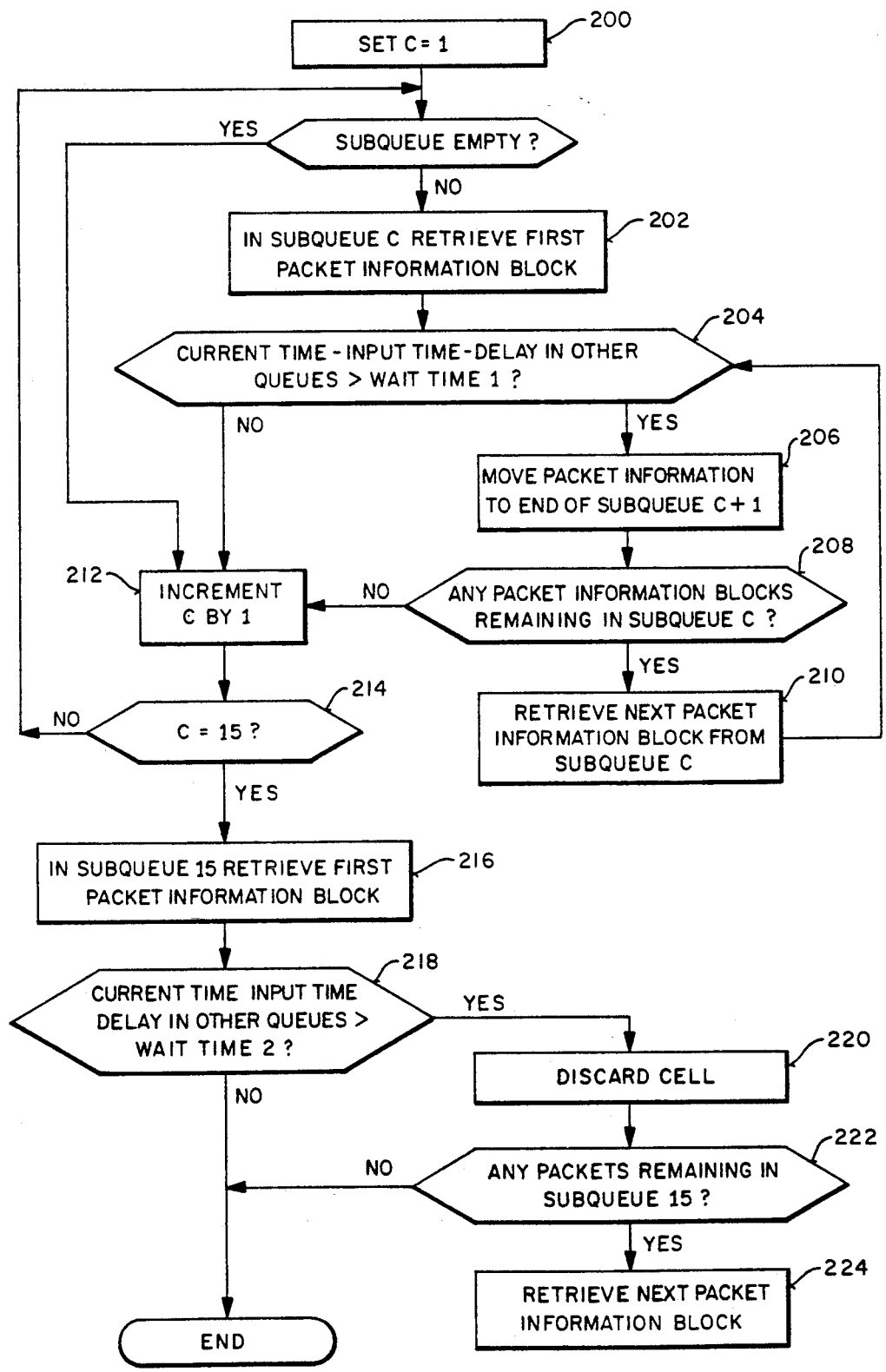

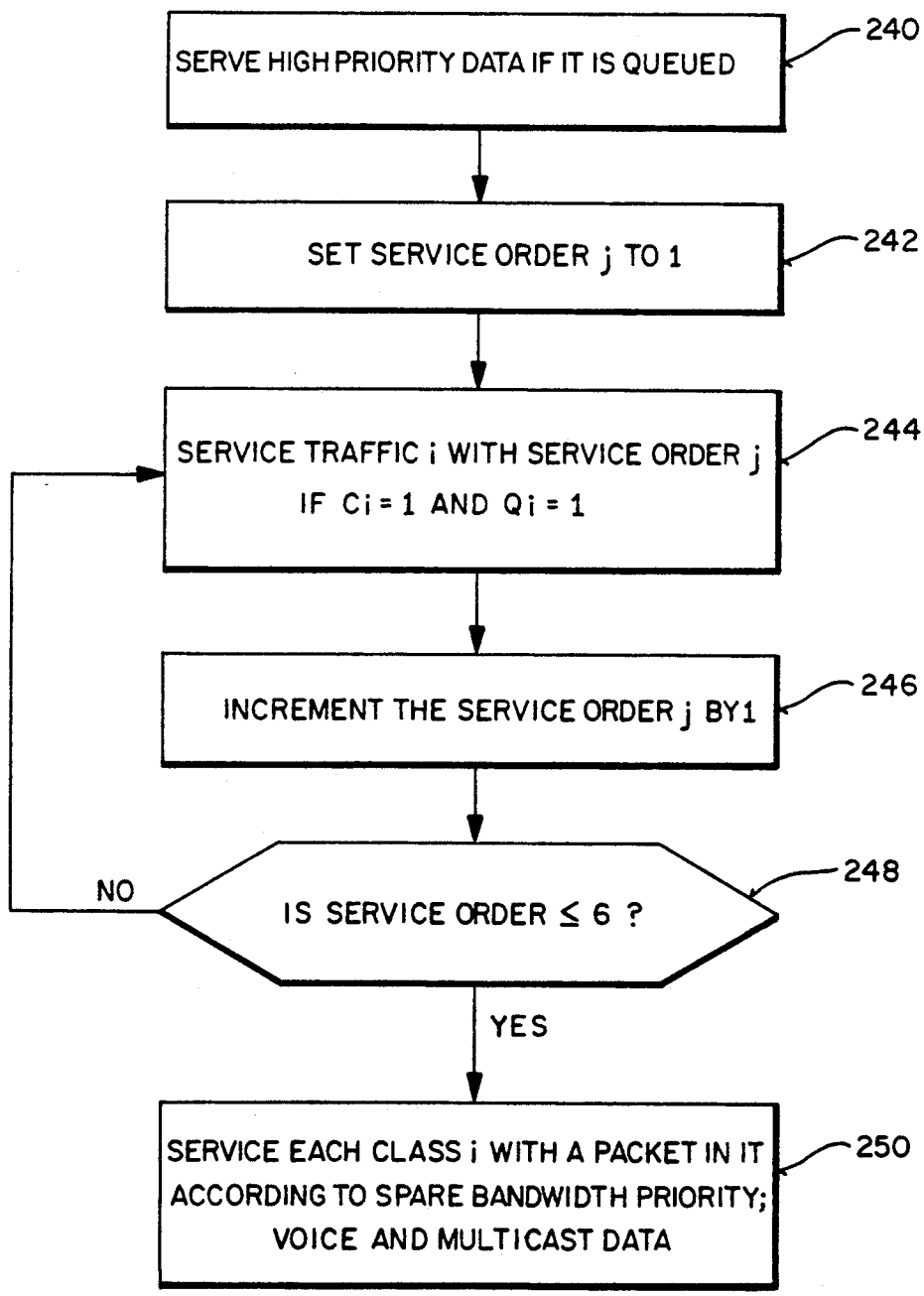
FIG _ 11

CIRCUITRY AND METHOD FOR FAIR QUEUING AND SERVICING CELL TRAFFIC USING HOPCOUNTS AND TRAFFIC CLASSES

FIELD OF THE INVENTION

The present invention relates to the field of cell switching network communications. More particularly, the present invention relates to circuitry and method for fair queueing and servicing of cell traffic using hopcounts and traffic classes.

BACKGROUND OF THE INVENTION

A traditional technology for voice transmission has been circuit switching. Circuit switching requires a physical connection between the source and destination. If the source and destination cannot be connected, a busy signal is sent to the source and the call must be completed later.

In contrast, packet switching allows digital data to be transmitted even when the source and destination cannot be directly connected. Packet switching also typically results in decreased system cost and increased system reliability. As a result, the use of high-speed packet switching networks to transmit digital data by private corporations has expanded rapidly in the past several years.

The use of two different technologies for the transmission of voice and digital data creates unnecessary redundancy and expense in telecommunication networks. The desire to reduce redundancy and expense associated with telecommunication networks provided impetus for the development of telecommunication network systems capable of integrating data, voice, image and video over high speed digital trunks. These networks use a packet switching technique called cell relay, which is also referred to as asynchronous transfer mode. U.S. patent application Ser. No. 07/285,041 entitled "Packet Voice/Data Communication System for Voice, Data and Deterministic Information," filed Dec. 15, 1988, assigned to the same assignee as the present patent application, and now abandoned, describes a prior integrated packet exchanger ("IPX") that integrates voice and data transmission over T1 lines.

A typically fully-integrated voice and data T1 network includes a number of geographically distant, interconnected nodes, each of which is a packet exchanger. Associated with each node is a variety of communication equipment. Each node takes existing voice and data streams from its associated communication equipment, assembles the streams into a more efficient cell format, and then transmits the cells between nodes via cell T1 lines.

A typical prior node handles four classes of cell traffic. Each class of traffic may carry a variety of data formats. Consequently, each class has different characteristics and different service requirements. For example, voice traffic is relatively delay sensitive and loss insensitive. In contrast, data traffic is relatively delay insensitive and loss sensitive, though this also varies with the particular data format. For example, file transfers are less delay sensitive than terminal to host protocols which are typically user interactive. To account for these differences, each class of traffic is placed in a queue, given a different priority, and serviced substantially according to that priority. During congested periods, when network traffic exceeds the network's throughput capabilities, servicing algorithms may discriminate between the traffic according to class.

One disadvantage of one prior queuing and servicing circuitry and method of U.S. patent application Ser. No. 07/285,041 is its bias against cell traffic that must travel through many nodes to reach its destination. U.S. patent application Ser. No. 07/285,041 addresses this bias using timestamps. However, timestamps cannot be practically extended to high-speed traffic due to the timestamp resolution.

Another disadvantage of prior queuing and servicing scheme implemented in U.S. patent application Ser. No. 07/285,041 is the failure to fairly allocate bandwidth among various classes of cell traffic.

Others have attempted to fairly allocate bandwidth in telecommunication nodes. For example, Manolis Katevenis describes a fair queuing method in "Fast Switching and Fair Control of Congested Flow in Broadband Networks," Vol. SAC-5, No. 8, I.E.E.E. J. on Selected Areas in Communications, 1315 (Oct. 1987) ("Katevenis"). Katevenis proposes implementing fair queuing using a queue for each source-destination pair.

A disadvantage of allocating bandwidth according to source-destination pair is that the number of required queues grows as the square of the number of sources.

A disadvantage of Katevenis and U.S. patent application Ser. No. 07/285,041 is that both fail to segregate multicast traffic from non-multicast traffic. The failure to do so can render a telecommunication network unusable during periods of excessive broadcast traffic, commonly referred to as broadcast storms.

SUMMARY OF THE INVENTION

It is an object of the present invention to provide circuitry and method to fairly queue and service cell traffic.

It is a further object of the present invention to guarantee minimum bandwidth to each class of cell traffic.

It is an object of the present invention to provide circuitry and method of queuing and servicing cell traffic that does not discriminate against traffic that must travel through many nodes to reach its destination.

It is yet another object of the present invention to reallocate unused bandwidth.

It is an object of the present invention to provide a fair queuing and servicing mechanism that extends to timestamped traffic.

A method of fair queuing and servicing cell traffic in a telecommunication node which interfaces with a telecommunication system including a multiplicity of nodes is described. The steps include placing cells of traffic into a queue according to a hopcount associated with each cell of traffic, the hopcount being representative of the number of nodes traversed by the associated cell. Cells of within the queue are serviced according to their associated hopcount. The hopcount associated with each cell of bursty traffic is incremented as each cell of traffic is serviced.

Circuitry for queuing and servicing packet traffic in a telecommunication node for interfacing with a telecommunication system including a multiplicity of nodes is also described. The circuitry includes apparatus for classifying traffic as non-bursty traffic and bursty traffic. Other apparatus allocates a first minimum bandwidth to the non-bursty traffic and a second minimum bandwidth to the bursty traffic. Apparatus accrues credit for the non-bursty traffic according to the first minimum bandwidth and for the bursty traffic according to the second minimum bandwidth. Also included is apparatus for placing packets of the non-bursty traffic in a first queue, and apparatus for placing packets of the bursty traffic in a second queue having a multiplicity of subqueues, the packets being placed in the subqueues according to a hopcount associated with each packet of bursty traffic, the hopcount being representative of a number of nodes traversed by the associated packet of bursty traffic, each subqueue having a different servicing priority. Apparatus moves a packet of bursty traffic from a one subqueue to another subqueue having a higher servicing priority than the subqueue after the packet of bursty traffic has remained in the one subqueue for a time T. Also included in the circuitry is apparatus for generating a first flag whenever a packet is in the first queue and a second flag whenever a packet is in the second queue. Another apparatus services packets within the first queue when the first flag is present and credit has accrued for the non-bursty traffic. Still other apparatus services packets within the second queue next if the second flag is present and credit has accrued for bursty traffic, the packets within the second queue being serviced according to subqueue priority. Apparatus services packets within the first queue next if no credit has accrued for either the non-bursty traffic or the bursty traffic and the first flag is present. Additional apparatus services packets within the second queue next if no credit has accrued for either the non-bursty traffic or the bursty traffic and the second flag is present, the packets within the second queue being serviced according to subqueue priority. The circuitry includes apparatus for incrementing the hopcount associated with each packet of bursty traffic when each packet of bursty traffic is serviced.

Other objects, features, and advantages of the present invention will be apparent from the accompanying drawings and the detailed description that follows.

BRIEF DESCRIPTION OF THE DRAWINGS

The present invention is illustrated by way of example and not limitation in the accompanying figures in which like references indicate similar elements and in which:

FIG. 1 is a block diagram of a telecommunication network for voice and data;

FIG. 2 is a cell format diagram;

FIG. 3 is a functional block diagram of a telecommunication node;

FIG. 4 is a voice data flow diagram;

FIG. 5 is a data flow diagram;

FIG. 6 is a block diagram of the T1 transmitter/receiver;

FIG. 7a is a diagram of a high priority data queue;

FIG. 7b is a diagram of a high speed statistical queue;

FIG. 8a is a diagram of a voice queue;

FIG. 8b is a diagram of low-speed statistical data queue;

FIG. 9 is a diagram of a queue utilizing hopcounts;

FIG. 10 is a flow diagram for aging queues for cell traffic utilizing hopcounts;

FIG. 11 is a flow diagram of a cell traffic servicing routine.

DETAILED DESCRIPTION

FIG. 1 illustrates a fully-integrated voice and data T1 telecommunication network 20 using telecommunication nodes 22, also referred to as integrated cell exchangers 22. The network 20 shown is a domestic network. Those skilled in the art will appreciate that the illustrated network 20 can be modified in known ways to accommodate international traffic by the addition of various E1-to-T1 and T1-to-E1 interfaces to each node 22.

Each node 22 incorporates a T1 transmitter/receiver that includes the fair queuing and servicing circuitry and method of the present invention. The T1 transmitter/receivers support two new classes of cell traffic that utilize hopcounts. As will be discussed in detail below, each T1 transmitter/receiver supports the new traffic classes via two queues and a special service routine. The queues establish priority among cells of traffic according to the number of nodes, or hops, traveled. The service routine quarantees a minimum amount of bandwidth to each class of traffic under normal operation and allocates spare bandwidth according to a predefined priority scheme.

Network 20 of FIG. 1 includes nodes 22 in Atlanta, Boston, Chicago, Dallas, and Seattle. Each node 22 is connected to local communication equipment. For example, in Atlanta, a private branch exchange (PBX) telephone system 24, a fax machine 26, a computer 28, video equipment 30, local area networks (LANs) 32, high speed statistical equipment 34, a control terminal 36 and a printer 38 are all connected to the integrated cell exchanger 22. All communication equipment associated with a node 22 is connected through circuit T1s 40.

Each telecommunication node 22 takes existing voice and data streams from its associated communication equipment, assembles the streams into a more efficient cell format, and transmits the cells between nodes via cell T1 lines 42. Similarly, each telecommunication node 22 receives cells from the cell T1 lines 42, disassembles the cells into data streams, and transmits those streams to the appropriate communication equipment via circuit T1 lines 40. Thus, each integrated node 22 can function both as a source and a destination of information.

The term "T1" refers to a telephone line operating at a synchronous data rate of 1.544 million bits per second. T1s are digital, thus, voice signals are digitized prior to their transmission over T1 lines. Under the DS-0 signaling standard, T1 lines are segmented into 24 individual channels operating at 64 thousand bits per second to support voice transmission.

Each node 22 increases the apparent capacity of cell T1 lines 42 using virtual connections. In other words, rather than committing specific resources to a given source-destination pair, each node 22 connects a source-destination pair only when information, in the form of a cell, is present. When cells are not being created for a given source-destination pair, the same network resources are used to transmit cells for other source-destination pairs.

Information is transmitted between nodes over the cell T1s lines 42 in the form of cells. Cells are packets of fixed length and are typically used in systems that switch a number of traffic classes, as opposed to a single traffic class as in packet switching. The short message length of cells as compared to packets permits cell switching networks to achieve very high rates of network utilization and still maintain short transmission delays. Despite the distinction between cells and packets, the terms are used interchangeably herein.

A general cell format is illustrated in FIG. 2. The cell includes 24 octets, or bytes, of information. The first two bytes, octet 0 and octet 1, represent the cell's virtual circuit identifier. The virtual circuit identifier allows the cell to be self-routing through network 20. Octet 2, the third byte, indicates the type of data contained within the cell; voice, video, etc. Octet 2 also includes a CRC code, which is used by node 22 to perform an error check. Octet 3, the fourth byte of the cell, may contain a time stamp or hopcount depending upon the traffic class. The remaining octets of the cell is generally devoted to information, or payload.

Using the traffic type bits in octet 2, and nodes 22 support six types of cell traffic. Identification of different traffic classes allows T1 transmitter/receivers to discriminate among classes of cell traffic for queuing and servicing purposes. Two of the classes of cell traffic are new. Four of the classes of cell traffic supported by nodes 22 are high priority traffic, voice traffic, low speed statistical traffic, and high-speed traffic. The two new classes of cell traffic as bursty traffic and multicast traffic.

High priority cells are indicated by a binary 100 in octet 2. High priority traffic includes inter-node cell exchanger-to-cell exchanger messages. This class of traffic is given the highest servicing priority so that network failures and overloads can be quickly remedied.

Voice traffic is represented by a binary 010 in octet 2. Voice traffic includes pulse coded modulated (PCM) and adaptive differential pulse coded modulated (ADPCM) voice signals. Such traffic is relatively intolerant of servicing delays but, given its statistical nature, can withstand some loss without adverse effect.

Low-speed statistical traffic includes cells generated by equipment operating at less than 64 thousand bits per second. Low speed statistical traffic can tolerate some delay between generation and transmission, but cannot tolerate any loss of data from a message. This class of traffic is represented by a binary 111 in octet 2.

Low speed statistical cells carry a timestamp in octet 3. Using timestamps, nodes 22 can determine how long low-speed statistical cells have been in network 20 and transmit the oldest cells first. Timestamps are also used to discard cells exceeding a maximum age, which is software-setable.

High speed statistical cells encompasses high-speed, full-period voice or data signals. This class of traffic tolerates very little service delay and is equally intolerant of loss of data from a message. A binary 110 in octet 2 indicates a cell of a high speed statistical.

The two new classes of cell traffic supported by nodes 22 are quite different from the four other traffic types. These classes of traffic transport highspeed, statistical data from sources such as local area networks (LANs), bridges, routers, brouters and high-speed cell switches. Both types of traffic are characterized by burstiness. As used herein, the term "bursty data" refers to bursty point-to-point traffic between nodes 22 while "multicast traffic" carries bursty traffic from any one to all other nodes 22 in networks 20. Both bursty traffic and multicast traffic are relatively delay insensitive, thus, during periods of congestion cells of these traffic classes may be buffered rather than discarded. Bursty traffic is represented by octet 2 by a binary 101 and multicast traffic is represented by a binary 011.

Bursty traffic and multicast traffic also differ from other traffic classes in that the octet 3 of each cell contains a hopcount. Hopcounts serve a purpose similar to timestamps, but are more practical than timestamps at high speeds. A cell's hopcount indicates the number of nodes 22 previously traversed by the cell in its journey between source and destination. The higher a cell's hopcount the greater the cell's service priority as compared to other cells within that class of traffic. In the preferred embodiment the maximum hopcount is 15; however this number is software selectable and may be easily modified to suit specific network applications.

Although hopcounts are utilized only with bursty traffic and multicast traffic in the preferred embodiment, nothing prevents the use of hopcounts with other classes of traffic. For example, hopcounts might be used with traffic carrying terminal to host data or file transfers.

A block diagram of a node 22, which includes the T1 transmitter/receiver of the present invention, is shown in FIG. 3. The circuitry within the node 22 performs two basic functions: traffic segmentation and reassembly. While the node 22 is functioning as a source of messages, segmentation involves receiving incoming bit streams from the communication equipment and assembling it into cell formats. The trunking interface queues and routes the cells through the network 20. Similarly, when node 22 functions as a destination for messages, the trunking interface receives cells and routes them to the appropriate circuitry for reassembly. Reassembly is the process of converting cells in to data streams.

Node 22 includes a processor controller 50, a data assembler/disassembler (PAD) group 52, a voice data assembler/disassembler (PAD) group 54, T1 transmitter/receiver 56, circuit/cell interface 58 and frame relay PAD 59. A system-wide system bus 60 which includes two buses, transports data and control information throughout node 22. Part of system bus 60, muxbus is a high speed statistical bus for switching cells. Also part of bus 60, control bus configures, manages, and monitors the components 50, 52, 54, 56, 58, and 59 of node 22.

Processor controller 50 manages the various circuits within nodes 22, with direction from an operator using a control terminal and a printer. Processor controller 50 manages the routing of cells via network configuration databases. Processor controller 50 distributes control and configuration information via the control bus to the 50, 52, 54, 56 58, and 59 each of which is coupled to the control bus by an 80C31 controller. Additionally, network processor controllers 50 in Atlanta, Boston, Chicago, etc., cooperate to perform network-wide functions.

Processor controller 50 uses a Motorola 68000, a 16 bit microprocessor, as its basic processing unit. The 68000 microprocessor contains the software for controlling, diagnosing, and monitoring integrated cell exchanger 22. This software is stored in 2 Megabytes of flash EPROM and 8 Mbytes of DRAM. The preferred embodiment of processor controller 50 also utilizes an Intel bus controller to manage the control bus.

A portion of the node's 22 segmentation and reassembly function is performed by voice/data processor 62. Voice/data processor 62 assembles and disassembles cells of voice and data samples for cell T1 lines 42 using the DS-0 standard. This includes voice-band data generated by modems and FAX machines. Voice/data processor 62 is bidirectional.

Each voice connection within network 20 requires two voice/data processors 62, one at each end of the connection. Utilizing voice activity detection the source voice/data processor 62 determines when to generate cells. Voice activity detection allows 2:1 compression of PCM voice. The source voice/data processor 62 extracts voice from a T1 port, packetizes it, and sends the packets to the remote voice/data processor 62. The remote voice/data processor 62 reassembles the voice signal from the cell stream and passes it on to the appropriate external device, for example, PBX 24.

Voice compressor/decompressor 64 receives voice samples from voice/data processor 62. The voice samples are converted from PCM to compressed adaptive differential pulse code modulation (ADPCM) when the node 22 is acting as a source. Voice compressor/decompressor 64 converts ADPCM back to PCM when node 22 acts as a destination.

Synchronous data interface 66, synchronous data cell assembler/disassembler 68, and low-speed data cell assembler/disassembler 70 perform another portion of the segmentation and reassembly function within node 22. Both cell assembler/disassemblers, 68 and 70, commonly referred to as packet assemblers/dissemblers (PADs) buffer, assemble and format data cells. The cells are transmitted to and received from system bus. Synchronous data PAD 68 provides four different physical interfaces: RS232C/D (V.24), V.35, RS422/449, and X.21/V.11. Low speed data PAD 70 supports low speed data applications. Both low speed data PAD 70 and synchronous data PAD 68 can be configured for transparent, bit-for-bit transmission or for data compression using repetitive pattern suppression.

Frame relay PAD 59 performs segmentation and reassembly of highspeed bursty data and multicast data. Frame relay PAD 59 is typically connected to LAN devices, such as routers and bridges.

Queuing and transmission functions for node 22 are provided by T1 transmitter/receiver 56 and circuit/cell interface 58. Transmitter/receiver 56 contains routing tables for the cells to be transmitted on cell T1 lines 40 and buffers, or queues, for those cells. Each of the six traffic types supported by node 22 is queued separately, as will be discussed in detail below. Transmitter/receiver 56 performs the T1 line framing and signal control, and cell servicing as well as alarm detection and generation. Circuit/cell interface 58 provides interface support for bidirectional T1 lines 40 and 42. The conversion of bipolar signals from cell T1 lines 42 into logic-levels for use internal to node 22 is also performed by circuit/cell interface 58.

The flow of voice data in and out of node 22 is illustrated in FIG. 4. Voice data from circuit T1 line 40 is received by circuit/cell interface 58, which converts bipolar pulses into logic level signals. After conversion the logic level voice signals are transmitted to T1 transmitter/receiver 56. Transmitter/receiver 56 demultiplexes the synchronous 64 thousand bit per second (Kbps) PCM voice and retransmits the voice data to system bus 60 as parallel, circuit switched data. System bus 60 delivers the data to voice/data processor 62 and voice compressor/decompressor 64 for compression and segmentation. Once segmented, the data returns to T1 transmitter/receiver 56 via system bus 60. Transmitter/receiver 56 then queues the cells for eventual transmission on cell T1 lines 42 via circuit/cell interface 58. Voice cells flowing into integrated cell exchanger 22 follow the reverse path.

Data is transmitted across T1 network 20 over a virtual circuit between a pair of data PADs, 68, 70, or 59. The flow of data into and out of node 22 is illustrated in FIG. 5. A data stream from local communication equipment is received either by synchronous data PAD 68, low speed data PAD 70, or frame relay PAD 59. The source data PAD 68, 70, or 59 builds data cells at a rate proportional to the baud rate of the data. The PAD, 68, 70, or 59 passes the cells to the packet-switched side of system bus 60 for delivery to transmitter/receiver 56. Transmitter/receiver 56 places the cells in the appropriate queue according to traffic type where the cells await delivery to cell/circuit interface 58. The cells are transmitted onto cell T1 lines 42 by cell/circuit interface 58. Cell traffic coming into node 22 follows the reverse path.

FIG. 6 illustrates T1 transmitter/receiver 56 which implements the circuitry and method of fair queuing and servicing cell traffic. T1 transmitter/receiver 56 is divided into two sections, a transmitter 72 and a receiver 70.

Receive state control 74 coordinates the operation of T1 receiver 70. Incoming data from another node 22 is received as a T1 bit stream 80 and an extracted clock 82 sent by circuit/cell interface 58. T1 deframer 84 strips the T1 framing pattern from the incoming bit stream and sends the received octets of the cell through descrambler 86 and CRC checker 88. If the CRC for the cell is in error the cell is destroyed. If the CRC is correct, the cell is placed into receive packet FIFO 90.

When muxbus output control 92 is notified by muxbus address and control signals 94 that it may dispatch a cell onto muxbus 96, the first cell stored in receive packet FIFO 90 is driven onto muxbus data bus 98 through output register 100. If there are no cells in receive packet FIFO 90, a cell consisting of "all ones" is written to muxbus data bus 98.

The operation of the T1 transmitter 72 is coordinated by queue manager 76. Queue manager 76 includes a high-speed microprocessor 110, RAM 112 and program ROM 114. The fair queueing and service routines are implemented in software, which runs on microprocessor 110. The fair queuing and servicing routines will be described below, following a general description of the structure and operation of transmitter 72.

The arrival of a cell via muxbus 96 to transmitter 72 is accompanied by a combination of asserted address and control signals 116 to input state control 118. Coincident with these control signals 116, the first two octets of the cell, comprising a virtual circuit identifier, are received into the pipeline registers 120 from muxbus data bus 96.

It the cell is to be queued, then input state control 118 performs a series of functions. First, a new packet start address is fetched from packet start address FIFO 124 which is passed together with the output of counter 126, through mux 128. This forms the address for queue memory 135. As each successive octet of the exits pipeline registers 120 onto queue memory bus 140, each byte is written into a location in queue memory 135 pointed to by the packet start address and indexed by counter 126, which increments with each octet.

Simultaneously, a packet information block is created for the cell. Octet 2 and 3 of the packet and the current time, which is used as a queue input time, are written into packet information FIFO 152. This is done through mux 154, and forms the packet information block. Thus, queue manager 76 is notified that a cell has just been queued, where that cell is stored, the traffic type, its timestamp value or hopcount, if applicable, and when the cell arrived.

Current time counter 158 is incremented by the 125 us clock 160 from muxbus 96. Current time counter 158 may be interrogated by queue manager 76.

When queue manager 76 decides to dispatch a cell, it writes the packet start address and update timestamp or updated hopcount, if applicable, to output state control 144. Output state control 144 fetches each byte of the cell to be dispatched from queue memory 130 by applying the appropriate addresses to queue memory 135 through mux 128. Each octet of the cell is moved via queue memory bus 140 through MUX 146 to CRC generator 142. Queue memory 135 is time-shared between input state control 118 and output state control 144.

In the case of timestamped data cells, an updated timestamp, previously written to output state control 144 by queue manager 76, will replace the fourth octet of the cell. This is achieved by activating mux 146. CRC generator 142 calculates and then writes a CRC-5 code into the lower bit field of the traffic type/CRC octet. The CRC covers the first four octets of the cell.

Similarly, in the case of cells bearing hopcounts, the cell hopcount will be updated prior to dispatch by queue manager 76. Again, the cell CRC will be recalculated by CRC generator 142.

The octets are then sent through scrambler 148 to T1 framer 150, which inserts cells into T2 frames.

Given this general description of the operation of transmitter 72, it will be appreciated that the difference in treatment between the various classes of cell traffic is determined by queue manager 76. Queue manager 76 performs two major functions. During queueing and servicing, queue manager 76 treats the classes of cell traffic differently.

During queueing, queue manager 76 fetches packet information blocks from packet information FIFO 152. Packet information blocks contain a representation of the cells that have been stored in queue memory 130. The traffic type field of the packet information block is interrogated to determine into which queue the packet information block should be appended. There are six traffic queues: high priority, voice, low/speed statistical, high speed deterministic, bursty, and multicast.

The queues are linked lists of packet information blocks as shown in FIGS. 7, 8, and 9. FIG. 7 shows the link-list structure for the high priority and high speed deterministic traffic queues, while FIG. 8 shows the structure of the voice and low-speed statistical traffic queues. FIG. 9 illustrates the queue structure of the bursty and multicast traffic queues, which utilize hopcounts.

The queueing of packet information blocks onto the high priority, speed deterministic and voice queues is identical. Each new packet information block is attached to the bottom of the link-list, which is pointed to by a last pointer, designated "LS". These include LSHP, LSHD, LSV. The top of each queue is pointed by the next pointer, designated "NX". These include NXHP, NXHD, and NXV. A link is added to each packet information block to allow the blocks to be linked together.

Queueing timestamped packet information blocks for lowspeed statistical data is somewhat more complicated. When a packet information block is read from packet information FIFO 152, it is assigned a time-value of:

$$TV = [(\text{Current Time} - \text{Input Time}) \text{ modulo } 512] + (2 * \text{oct } 3);$$

where TV represents a time value.

This time value represents the queueing age of the cell, which consists of the time it has spent in packet information FIFO 152 plus the time it has spent in queues elsewhere in the network 20, which is represented by the timestamp in octet 3 of the cell. The timestamp includes nine binary bits, which are truncated to the eight most significant bits when the cell is transmitted. This explains the multiplication by 2 of octet 3.

Once the time value is known, the packet information block representing the cell can be queued into lowspeed statistical data queue. Cells within this queue carry timestamp. This queue consists of an array of 512 linklists, each element of the array representing a time value. There are three pointers to this array called age zero, designated "AGEZER", age maximum, designated "AGEMAX", and oldest data packet first, designated "ODPF". These point to the array elements representing the youngest and the oldest cells ages possible as well as the element containing the oldest packet information blocks currently queued, respectively.

The AGEZER and AGEMAX pointers are used as offsets for determining onto which array element a packet information block should be queued. At every 125 us tick, these two pointers are decremented by modulo 512 so that when a packet information block is to be queued, it is placed onto array element [(AGEZER + TV) modulo 512]. Because the age of the packet information block is now referenced to AGEZER, each decrement of AGEZER represents an increment of the true time value, TV. If element [(AGEZER + TV) modulo 512] is not bracketed between AGEZER and AGEMAX, then the cell is too old and is discarded. Each of the array elements are, as previously mentioned, actually link-lists. The top of the link-list is pointed to by the appropriate element of the data packet first array, designated DPF, i.e., DPF[AGEZER + TV]. The last element of the list is pointed to by the corresponding element in the data packet last array, designated DPL (i.e., DPL[AGEZER + TV]). When a packet information block is queued, it is placed on the bottom of the appropriate linklist. As before, a LINK is added to the packet information block to allow it to be attached to the next item on the list.

When the AGEMAX pointer is decremented, any cells represented by the packet information blocks queued in the link-lists pointed at by AGEMAX are dropped because they exceed the maximum age.

The bursty traffic and multicast traffic queues are identical. Thus, while the description that follows refers to the bursty traffic queue, it will be understood that the following description applies equally to the multicast traffic queue. Queuing of bursty traffic differs from the queuing schemes previously described. The difference arises, in part, because the bursty traffic queue includes 15 subqueues, numbered 1 through 15, as shown in FIG. 9. Each of the subqueues is a FIFO queue including a set of linked-lists. As each cell of bursty traffic is received it is placed into one of the subqueues according to the hopcount stored in octet 3 of the cell. Thus, a cell of bursty traffic with a hopcount of 13 will be placed at the end of subqueue 13 of the bursty data queue. Cells of bursty traffic having hopcount greater than 15 are simply discarded, as they have used more network resource than permitted. The maximum hopcount is 15 in the preferred embodiment; however, this maximum can be increased to allow cells of bursty data traffic to use more network resource.

Cells within the bursty traffic queue are serviced according to subqueue priority order, with subqueue 16 having the highest priority and subqueue 1 having the lowest priority. For the bursty traffic queue a subqueue pointer indicates the highest ranked non-empty subqueue. The indicated subqueue will be serviced first whenever bursty data traffic is serviced. The subqueue pointer is updated whenever cells are placed into the bursty data queue or the queue is serviced.

Servicing the bursty traffic queue includes taking the cell designated by the subqueue pointer and updating both the linked lists and queue depths. Additionally, during the servicing of the bursty data queue the hopcount of the serviced cell is incremented by 1. If the serviced cell was the last cell in the subqueue, the subqueue pointer is updated to indicate the highest priority non-empty subqueue.

The result of the priority scheme used in the bursty traffic queue is that priority is given to cells which have used more network resource. Possible undesirable effects of this priority scheme are freezing of lower priority subqueues during periods of congestion and lengthy queuing delays. These effects are avoided by an aging mechanism. The aging mechanism allows overaged cells to be discarded, while cells that have spent too long in one subqueue are moved to the next subqueue with a higher priority. A cell's queuing priority is effectively increased by moving to another subqueue, but the hopcount in unaffected.

FIG. 10 illustrates the method implemented by queue manager 76 to age and move cells from one bursty traffic subqueue to another to prevent length queueing delays. In state 200, a counter C is set to 1 in anticipation of examining the lowest priority bursty traffic subqueue. From state 200 queue manager 76 branches to state 201.

In state 201 queue manager 76 determines whether subqueue 1 is empty. If it is not, queue manager 76 branches to state 202.

In state 202, queue manager 76 retrieves the first packet information block in the subqueue indicated by counter C. From state 202 queue manager 76 branches to state 204.

In state 204 the retrieved packet information block is examined to determine whether it has remained in the subqueue for too long. This is determined by subtracting the current time, as reported by current time 158, plus the time spent in other subqueues from the input time stored within the packet information block. If the resulting number exceeds a first selectable wait time, queue manager 76 branches to state 206. In the preferred embodiment, the default value for the first wait time is 16 msec.

In state 206, the packet information block representing the overaged cell is moved from its present subqueue to the next highest subqueue; i.e. the cell is moved from subqueue C to subqueue C+1. Thus, the servicing priority of the cell is increased. The cell hopcount is unaffected by moving between subqueues, permitting the hopcount to accurately represent the number of nodes 22 traversed by the cell.

From state 206, queue manager 76 branches to state 208. In this state queue manager 76 determines whether there are any cells remaining in the subqueue indicated by C. If so, queue manager 76 branches to state 210.

Instate 210, the packet information block for the next cell within the indicated subqueue is retrieved. Afterward, queue manager 76 proceeds to state 204 to determine whether the cell has waited too long in subqueue C. If the cell has waited too long, queue manager 76 will move the cell to the next subqueue by branching to state 206, as described previously.

If, on the other hand, the cell has not been in the subqueue too long, queue manager 76 branches to state 210, effectively deciding that no other cells within the current subqueue required aging. The FIFO structure of the subqueues make this decision possible.

When no packet information blocks remain for examination in the subqueue indicated by counter C for examination, or none waited too long, queue manager 76 branches to state 212. In state 212, subqueue counter C is incremented by one, thereby preparing queue manager 76 to examine another high priority subqueue.

Queue manager 76 branches to state 214 from state 212. In this state if is determined whether every subqueue other than subqueue 15 has been aged. If not, queue manger 76 branches back to state 202. Aging of the new subqueue proceeds as described above, with queue manger 76 branching through states 202, 204, 206, 208, 210, 212 and 214 until every subqueue from 1 to 14 is examined.

After subqueue 14 has been aged, C is incremented to 15 in state 212. From state 214 queue manager 76 branches to state 216 to begin aging the highest priority subqueue 15. The process of aging subqueue 15 begins by retrieving the first packet information block in subqueue 15. Queue manger 76 branches to state 218 from state 216.

In state 218 the current time is compared to the cell's input time plus time spent in other queues to determines whether the difference exceeds a second wait time. The second wait time is selectable, and may exceed the first wait time used in state 204. In the preferred embodiment, the default value of second wait time is 16 msec. If the cell is too old, queue manager 76 branches to state 220, where the cell is discarded.

From state 220, queue manager 76 proceeds to state 222. There it is determined whether any cells remain in subqueue 15. If any cells remain, the next packet information block is retrieved in state 224. From state 224, queue manager 76 proceeds to state 218 and flows through states 220, 222 and 224 as described above until the aging routine ends.

The aging routine can end in one of two manners. In state 218 queue manager 76 may determine that the cell currently being examined has and remained in the bursty data queue for a period of time exceeding the second wait time. In this situation, queue manager 76 branches to the end, state 226, because the FIFO structure of subqueue 15 guarantees that none of the remaining cells have remained in the subqueue for a greater period of time than the second wait time. The aging of the bursty traffic queue will also end if, in state 222, queue manager 76 determines that no more cells remain to be examined. In that case, queue manager 76 branches to state 226 from state 222.

The time required to age all of the subqueues within the bursty traffic queue depends upon the number of non-empty subqueues and the number of cells queued. If few subqueues are non-empty and few cells are queued then all subqueues could be aged in as little as 125 $\mu$sec, in the preferred embodiment. On average, in the preferred embodiment, the time required to age the bursty data queue should be less than 1 msec.

The queuing and aging mechanisms described above provide a number of advantages. Because cells using the same virtual circuit follow the same route the hopcount mechanism guarantees that cells cannot pass one another during transmission. Further, hopcount queues give higher priority to those cells that have used more network resource. The aging mechanism prevents the freezing out of cells with relatively low hopcounts.

Again, it is to be understood that the multicast traffic queue is identical to the bursty data queue and that the description of the bursty traffic queue applies equally to the multicast traffic queue.

The two new classes of traffic, bursty traffic and multicast traffic, not only require new queues to support them. The servicing mechanism utilized in transmitter 72 must also account for and support the two new classes of traffic.

The service routine used by queue manager 76 to ensure fair queuing of cell traffic utilizes service priorities determined by the minimum bandwidth allocation for each class. The larger the allocated bandwidth the higher the service priority for the class. Additionally, for each class of traffic, a priority must be selected for spare bandwidth allocation.

Table 1 details the mapping of service order, j, and spare bandwidth priorities, k, for each class of traffic, i, in the preferred embodiment. Note that the service priority is according to assigned minimum bandwidth.

TABLE 1

| Traffic Name | Class Number i | Service Order*, j | Spare Bandwidth Priority, k |
|---|---|---|---|
| High Priority | 0 | First | X |
| High Speed Deterministic | 1 | Second | 1 |
| Low Speed Statistical | 2 | Third | 2 |
| Voice | 3 | Fourth | 3 |
| Bursty | 4 | Fifth | 4 |
| Multicast | 5 | Sixth | 5 |

*Service order determined by minimum configured bandwidth.

The servicing routine uses a credit accrual scheme to ensure that each class of traffic receives a selectable minimum bandwidth. In selecting minimum bandwidths for each class of traffic let N denote the total available bandwidth on a cell T1 trunk and let T denote the queue server tick interval. The unit of N is not relevant; it can be specified as a number of cells per second, or any other throughput unit. For a non-fractional T1 trunk N=8000 cells per second. Similarly T can be given in any convenient unit of time. In the preferred embodiment of the node the tick interval T equals 125 microseconds. Thus, the product N*T represents the capacity of the cell trunk per tick interval, or the quantum of bandwidth.

Each class of traffic is assigned a minimum amount of the quantum of bandwidth, with the exception of high priority traffic. This is because all high priority traffic will be serviced regardless of the required bandwidth. The sum of the minimum class bandwidths must be less than N to allow some bandwidth for high priority traffic. In other words, if i represents the class number, and $N_i$ represents the minimum bandwidth assigned to the $i^{th}$ traffic class, then $N_1+N_2+N_3+N_4+N_5<N$.

Each minimum bandwidth $N_i$ can be transformed into a timer value, $D_i$, representative of the number of tick intervals T that must elapse for traffic class i to acquire its quantum of bandwidth. The timer value $D_i=(1-/N_i)/T$. Note that $D_i$ may not be an integer value because it represents a ratio of bandwidths.

Given selected timer values $D_i$ for i=1, 2, 3, 4, 5, a credit accrual routine runs simultaneously with the service routine. Each class of traffic i is assigned a timer $T_i$, which is initialized to the associated timer value, $D_i$. The timer $T_i$ is decremented every T units of time. When the value of timer $T_i$ is less than or equal to zero a transmission credit $C_i$ accrues for traffic class i. Because of the inverse relationship between $N_i$ and $D_i$, the greater the allocated minimum bandwidth for a class of traffic the faster the rate at which it acquires transmission credit. The presence of a transmission credit permits a cell from traffic class i to be serviced. After servicing of class i, timer $T_i$ is updated by adding $D_i$ to the previous value of $T_i$. Using this method of accrual, each class of traffic i accrues $N_i$ credit in a tick interval of T.

The maximum number of credits, $Cmax_i$, that may be accrued for each class of traffic i is selectable. In the preferred embodiment the maximum credit that may accrue to any traffic class is 1.

FIG. 11 is a flow diagram of the service routine for a single tick interval implemented by queue manager 76. The service routine utilizes credits $C_i$, boolean flags $Q_i$ and spare bandwidth priorities j. Flag $Q_i$ is set to 1 by queue manager 76 whenever a cell is placed into the queue for traffic class i. Using a credit based strategy of servicing cell traffic, queue manager 76 quarantees each class of traffic a minimum bandwidth.

At the beginning of the tick interval queue manager 76 starts at state 240 and examines the flag $Q_0$ for high priority traffic. If $Q_0=1$, then a cell of high priority traffic is queued, and queue manager 76 will service a cell of high priority traffic. Thus, it will be understood that no credit is necessary for high priority traffic to be serviced. The only requirement for servicing of high priority traffic is the presence of a cell in the high priority queue.

If, on the other hand, $Q_0=0$ because no cells are present in the high priority queue, then queue manager 76 beings examining the availability of cells and credit for each class. This examination occurs in order of traffic class service priority. Thus, it will be understood that the next step is setting the service order, j to 1, as done in state 242.

In state 244, the queue manager 76 finds class i associated with service order j. For the $i^{th}$ class, in state 244 queue manager 76 examines both the associated boolean flag $Q_i$ and associated credit $C_i$. A cell of traffic for class i will be serviced if credit has accrued to that class of traffic and a cell of that class is present in the associated queue. In other words, a cell of traffic from class i will be serviced in state 244 only if $Q_i=1$ and $C_i=1$.

If, during state 244, no credit is available for class i or no cell is queued for class i, then spare bandwidth results. In other words, spare bandwidth results when either $C_i=0$ or $Q_i=0$.

If no packet is served in state 244 the queue manager 76 branches to state 246. In state 246, the service order j is incremented by one, preparing queue manager 76 to service, if necessary, the traffic class with the next highest service order. From state 246 queue manager 76 branches to state 248.

In state 248 queue manager 76 determines whether the boolean flag and credit has been polled for every class of traffic. As the highest class number used in the preferred embodiment is 5, every class of traffic will have been polled when i=6. Thus, for every value of i less than or equal to 6, queue manager 76 will branch to state 244 from state 248.

Queue manager 76 cycles through states 244, 246, and 248 until the boolean flag and credit for every class of traffic has been examined. When that occurs, queue manager 76 branches to state 250 from state 248.

In state 250, queue manager 76 allocates spare bandwidth among the classes of traffic generating cells in excess of their allocated minimum bandwidth. Spare bandwidth is allocated according to spare bandwidth priority, k. The queue manager services class i associated with spare bandwidth priority k, starting at j=1 and proceeding to j=5. Obvbiously, spare bandwidth can be allocated to a classof traffic only if a cell of that class is present, as indicated by $Q_j=1$.

The order of allocating spare bandwidth described causes the impact of heavy high priority traffic to be born primarily by bursty data, multicast data and voice data. Correspondingly, low-speed statistical data and high speed statistical are less affected by periods of heavy high priority data.

In the foregoing detailed description a telecommunication node utilizing two new classes of cell traffic has been described. Both classes of cell traffic utilize hopcounts, and are queued in separate queues according to hopcounts. This queuing method increases the priority of cells that have utilized more network resource. A service mechanism quarantees a minimum bandwidth is each class of cell traffic by using a credit manager.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of fair queuing and servicing cell traffic in a telecommunication node for interfacing with a telecommunication system including a multiplicity of nodes, said method comprising:
   a. classifying a subset of cell traffic as bursty traffic;
   b. placing cells of said bursty traffic in a queue according to a hopcount associated with each cell of bursty traffic, said hopcount being representative of a number of nodes traversed by the associated cell of bursty traffic;
   c. servicing cells of bursty traffic within said queue according to said associated hopcount, cells of bursty traffic with a greater hopcount being serviced before cells of bursty traffic with a lower hopcount; and
   d. incrementing said hopcount associated with each cell of bursty traffic when each cell of bursty traffic is serviced.

2. The method of queuing and servicing cell traffic of claim 1 wherein said bursty traffic comprises point to point traffic.

3. The method of queuing and servicing cell traffic of claim 1 wherein said bursty traffic comprises multicast data.

4. A method of queuing and servicing packet traffic in a telecommunication node for interfacing with a telecommunication system including a multiplicity of nodes, said method comprising:
   a. classifying traffic an non-bursty traffic and bursty traffic,
   b. allocating a first minimum bandwidth to said non-bursty traffic and a second minimum bandwidth to said bursty traffic;
   c. accruing transmission credit for said non-bursty traffic according to said first minimum bandwidth and for said bursty traffic according to said second minimum bandwidth;
   d. placing packets of said non-bursty traffic in a first queue;
   e. placing packets of said bursty traffic in a second queue according to a hopcount associated with each packet of bursty traffic, said hopcount being representative of a number of nodes transverse by the associated packet of bursty traffic;
   f. generating a first flag whenever a packet is in said first queue and a second flag whenever a packet is in said second queue;
   g. servicing packets within said first queue when said first flag is present and transmission credit has accrued for said non-bursty traffic;
   h. servicing packets within said second queue next when said second flag is present and transmission credit has accrued for said bursty traffic, packets of bursty traffic with a greater hopcount being serviced before packets of bursty traffic with a lower hopcount;
   i. servicing packets within said first queue next if no transmission credit has accrued for either said non-bursty traffic or said bursty traffic and said first flag is present;
   j. servicing packets within said second queue next if no transmission credit has accrued for either said non-bursty traffic or said bursty traffic and said second flag is present, packets of bursty traffic with a grater hopcount being serviced before packets of bursty traffic with a lower hopcount; and
   k. incrementing said hopcount associated with each packet of bursty traffic when each packet of bursty traffic is serviced.

5. The method of queuing and servicing packet traffic of claim 4 wherein said bursty traffic comprises bursty point to point traffic.

6. The method of queuing and servicing packet traffic of claim 4 wherein said bursty traffic comprises multicast data.

7. A method of queuing and servicing packet traffic in a telecommunication node for interfacing with a telecommunication system including a multiplicity of nodes, said method comprising:
   a. classifying a subset of packet traffic as bursty traffic;
   b. placing packets of said bursty traffic in a queue having a multiplicity of subqueues, said packets being placed in said subqueues according to a hopcount associated with each packet of bursty traffic, said hopcount being representative of a number of nodes traversed by the associated packet of bursty traffic, each subqueue having a different servicing priority;
   c. moving a packet of bursty traffic from a one subqueue to another subqueue having a higher servicing priority than said one subqueue after said packet of bursty traffic has remained in said one subqueue for a time T;

d. servicing packets of bursty traffic within said queue according to subqueue priority; and e. incrementing said hopcount associated with each packet of bursty traffic when each packet of bursty traffic is serviced.

8. The method of queuing and servicing packet traffic of claim 7 wherein said bursty traffic comprises bursty point to point traffic.

9. The method of queueing and servicing packet traffic of claim 7 wherein said bursty traffic comprises multicast data.

10. A method of queuing and servicing packet traffic in a telecommunication node for interfacing with a telecommunication system including a multiplicity of nodes, said method comprising:

a. classifying traffic as non-bursty traffic and bursty traffic, b. allocating a first minimum bandwidth to said non-bursty traffic and a second minimum bandwidth to said bursty traffic;

c. accruing transmission credit for said non-bursty traffic according to said first minimum bandwidth and for said traffic according to said second minimum bandwidth;

d. placing packets of said non-bursty traffic in a first queue;

e. placing packets of said bursty traffic in a second queue having a multiplicity of subqueues, said packets being placed in said subqueues according to a hopcount associated with each packet of bursty traffic, said hopcount being representative of a number of nodes traversed by the associated packet of bursty traffic, a subqueue associated with a greater hopcount having a higher servicing priority than a subqueue associated with a lesser hopcount;

f. moving a packet of bursty traffic from a one subqueue to another subqueue having a higher servicing priority than said one subqueue after said packet of bursty traffic has remained in said one subqueue for a time T;

g. generating a first flag whenever a packet is in said first queue and a second flag whenever a packet is in said second queue;

h. servicing packets within said first queue when said first flag is present and transmission credit has accrued for said non-bursty traffic;

i. servicing packets within said second queue next if said second flag is present and transmission credit has accrued for said bursty traffic, said packets within said second queue being serviced by subqueue according to the servicing priority of the subqueue;

j. servicing packets within said first queue next if no transmission credit has accrued for either said non-bursty traffic or said bursty traffic and said first flag is present;

k. servicing packets within said second queue next if no transmission credit has accrued for either said non-bursty traffic or said bursty traffic and said second flag is present, said packets within said second queue being serviced by subqueue according to the servicing priority of the subqueue; and i. incrementing said hopcount associated with each packet of bursty traffic when each packet of bursty traffic is serviced.

11. The method of queuing and servicing packet traffic of claim 10 wherein said bursty traffic comprises bursty point to point traffic.

12. The method of queuing and servicing packet traffic of claim 10 wherein said bursty traffic comprises multicast data.

13. Circuitry for queuing and servicing packet traffic in a telecommunication node for interfacing with a telecommunication system including a multiplicity of nodes, said circuitry comprising:

a. circuitry for classifying traffic as non-bursty traffic and bursty traffic, b. circuitry for allocating a first minimum bandwidth to said non-bursty traffic and a second minimum band width to said bursty traffic;

c. circuitry for accruing transmission credit for said non-bursty traffic according to said first minimum bandwidth and for said bursty traffic according to said second minimum bandwidth;

d. circuitry for placing packets of said non-bursty traffic in a first queue;

e. circuitry for placing packets of said bursty traffic in a second queue having a multiplicity of subqueues, said packets being placed in said subqueues according to a hopcount associated with each packet of bursty traffic, said hopcount being representative of a number of nodes traversed by the associated packet of bursty traffic, a subqueue associated with a greater hopcount having a greater servicing priority than a subqueue associated with a lesser hopcount;

f. circuitry for moving a packet of non-bursty traffic from a one subqueue to another subqueue having a higher servicing priority than said one subqueue after said packet of bursty traffic has remained in said one subqueue for a time T;

g. circuitry for generating a first flag whenever a packet is in said first queue and a second flag whenever a packet is in said second queue;

h. circuitry for servicing packets within said first queue when said first flag is present and transmission credit has accrued for said non-bursty traffic;

i. circuitry for servicing packets within said second queue next it said second flag is present and transmission credit has accrued for said bursty traffic, said packets within said second queue being serviced by subqueue according to the servicing priority of the subqueue;

j. circuitry for servicing packets within said first queue next if no transmission credit has accrued for either said non-bursty traffic or said bursty traffic and said first flag is present;

k. circuitry for servicing packets within said second queue next if not transmission credit has accrued for either said non-bursty traffic or said bursty traffic and said second flag is present, said packets within said second queue being serviced by subqueue according to the servicing priority of the subqueue; and i. circuitry for increasing said hopcount associated with each packet of bursty traffic when each packet of bursty traffic is serviced.

14. A method of fair queuing and servicing cell traffic in a telecommunication node for interfacing with a telecommunication system including a multiplicity of nodes, said method comprising:

a. classifying one subset of cell traffic as a first type of bursty traffic and another subset of cell traffic as a second type of bursty traffic.

b. placing cells of said first type of bursty traffic in a first queue according to a hopcount associated with each cell of said first type of bursty traffic, said hopcount being representative of a number of nodes traversed by the associated cell of said first type of bursty traffic;

c. placing cells of said second type of bursty traffic in a second queue according to a hopcount associated with each cell of said said type of bursty traffic, said hopcount being representative of a number of nodes traversed by the associated cell of said second type of bursty traffic;

d. servicing cells of bursty traffic within said first queue and said second queue according to said associated hopcount; and e. incrementing said hopcount associated with each cell of each type of bursty traffic when each cell of bursty traffic is serviced.

15. The method of claim 14 wherein said first type of bursty traffic comprises bursty point to point traffic and said second type of bursty traffic comprises multicast traffic.

16. A method of fair queuing and servicing cell traffic in a telecommunication node for interfacing with a telecommunication system including a multiplicity of nodes, said method comprising:

a. placing cells of cell traffic in a queue according to a hopcount associated with each cell of traffic, said hopcount being representative of a number of nodes traversed by the associated cell of traffic;

b. servicing cell of traffic within said queue according to said associated hopcount, cells with a greater hopcount being serviced before cells with a lower hopcount; and c. incrementing said hopcount associated with each cell of traffic when each cell of traffic is serviced.

* * * * *